United States Patent
Gennetten et al.

(10) Patent No.: US 6,771,901 B2
(45) Date of Patent: Aug. 3, 2004

(54) CAMERA WITH USER IDENTIFICATION

(75) Inventors: K Douglas Gennetten, Ft Collins, CO (US); Steven L Webb, Loveland, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/003,825

(22) Filed: Oct. 31, 2001

(65) Prior Publication Data
US 2003/0081950 A1 May 1, 2003

(51) Int. Cl.[7] .............................................. G03B 17/00
(52) U.S. Cl. ...................... 396/297; 348/161; 348/552
(58) Field of Search ................................ 396/297–300; 348/161, 552

(56) References Cited

U.S. PATENT DOCUMENTS

| | | | | |
|---|---|---|---|---|
| 5,416,556 A | * | 5/1995 | Suzuki et al. ................. 396/89 |
| 5,715,487 A | * | 2/1998 | McIntyre et al. ............ 396/299 |
| 6,134,606 A | * | 10/2000 | Anderson et al. ............. 710/14 |
| 6,433,818 B1 | * | 8/2002 | Steinberg et al. ........... 348/161 |
| 2003/0023882 A1 | * | 1/2003 | Udom ........................ 713/202 |

FOREIGN PATENT DOCUMENTS

GB 2360658 A 3/2000

* cited by examiner

Primary Examiner—David M. Gray

(57) ABSTRACT

A camera comprising a memory for storing at least one camera setting for each of at least one user, a user identification sensor for identifying at least one of the at least one user of the camera, and a processor for controlling the camera according to the stored at least one camera setting in response to a signal from the sensor. Alternatively, a camera may comprise means for identifying at least one user of the camera, and means for automatically controlling the camera according to the identification of the user.

12 Claims, 4 Drawing Sheets

CAMERA WITH USER IDENTIFICATION

TECHNICAL FIELD

The technology disclosed here generally relates to photography, and more particularly, to a camera with user identification.

BACKGROUND

Modern cameras, including photographic cameras, are available with a wider variety of adjustable features than ever before. While these controls provide photographers with enhanced flexibility, they can also present a bewildering set of choices for novice users. For example, conventional film cameras offer a plethora of settings choices, including manual, automatic, and semi-automatic exposure modes; manual, automatic, macro, infinity, and locked focus modes; wide-angle and zoom magnification modes; shutter-preferred, aperture-preferred, automatic and manual exposure modes; automatic, fill and red-eye reduction flash modes; single, continuous, and timed shutter control modes; date and time imprinting modes, and many others. Digital cameras often utilize many of these same controls, and more, such as light balance, audio recording, print formatting, optical zoom, resolution, and other controls. While it is difficult for a single user to manage all of these settings, the problem of settings management becomes even more complex when the camera is shared by multiple users.

SUMMARY OF THE INVENTION

These and other drawbacks of conventional technology are addressed here by providing a camera comprising a memory for storing at least one camera setting for each of at least one user, a user identification sensor for identifying at least one of the at least one user of the camera, and a processor for controlling the camera according to the stored at least one camera setting in response to a signal from the sensor. Another possible embodiment is camera that comprises means for identifying at least one user of the camera, and means for automatically controlling the camera according to the identification of the user. Another possible embodiment of the invention includes a method of receiving a user identification and controlling the camera according to the received user identification. A further possible embodiment of the invention is a computer-readable medium for use with a camera, comprising logic for identifying at least one user of the camera and logic for controlling the camera according to the identification of the user.

BRIEF DESCRIPTION OF THE DRAWINGS

The invention can be better understood with reference to the following drawings. The components in the drawings are not necessarily shown to scale, emphasis instead being placed upon clearly illustrating the principles of the present invention. Moreover, like reference numerals are used in each of the figures in order to designate corresponding parts throughout the several views.

DETAILED DESCRIPTION OF THE PREFERRED EMBODIMENTS

Figure 1:
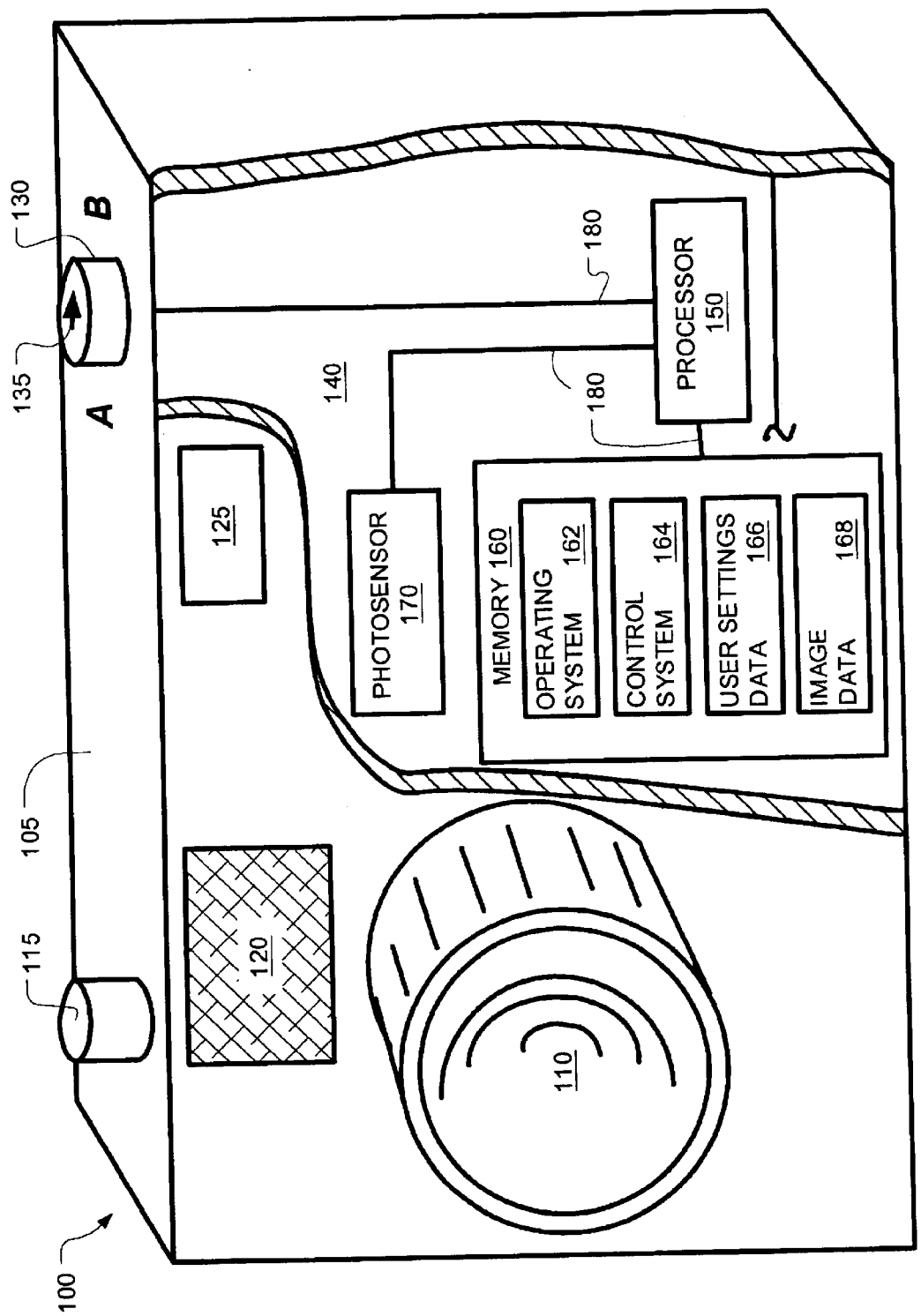
FIG. 1 is a schematic diagram of an embodiment of a camera according to the present invention.

FIG. 1 is a schematic diagram of an embodiment of a camera 100 according to the present invention. Although FIG. 1 is illustrated as a digital camera for taking still photographs, a variety of other cameras may be similarly configured, including film cameras, video cameras, motion picture cameras, or any other device that captures and/or records image information. The principles disclosed here can also be expanded to other types of data capture devices, including scanners, audio recorders, and personal digital assistants.

The camera 100 includes a body 105 that supports a lens 110, shutter control button 115, flash 120, and view finder 125. The camera 100 may also be provided with other components, such as, but not limited to, a flash sensor, range finder, focal length control, and/or microphone.

Figure 2:
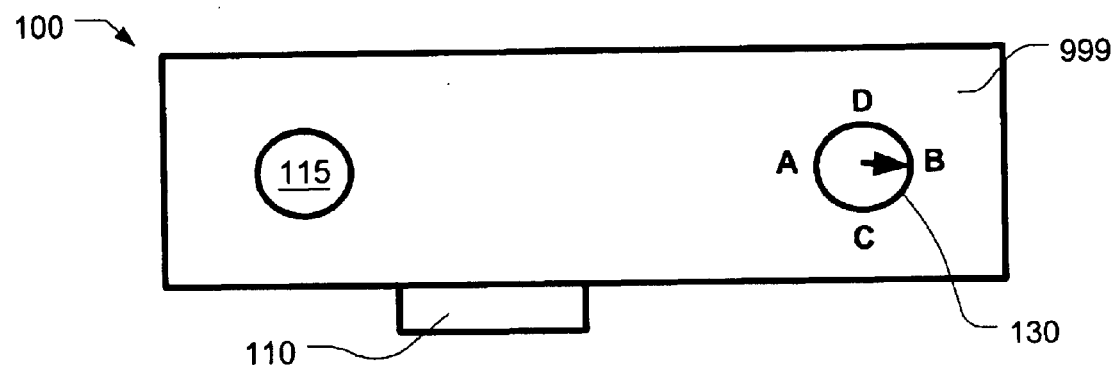
FIG. 2 is a top view of the camera shown in FIG. 1.

The camera body 105 is also provided with a user identification sensor, which is illustrated as switch 130 shown in FIG. 1. For example, the switch 130 may be a toggle, button, slide, or rotating knob. The user identification sensor is used to provide the camera 100 with information concerning the identity of the user of the camera. In particular, the rotational switch 130 shown in FIG. 1 may be rotated between two positions where the arrow 135 points to either indicia A or indicia B. The indicia may correspond to the identifications of different users of the camera, or an identified user and a non-identified user. Additional indicia may also be provided as better shown in the top view of camera 100 in FIG. 2. It will be appreciated that more, or fewer, mechanisms are available for user identification sensor(s).

Figure 3:
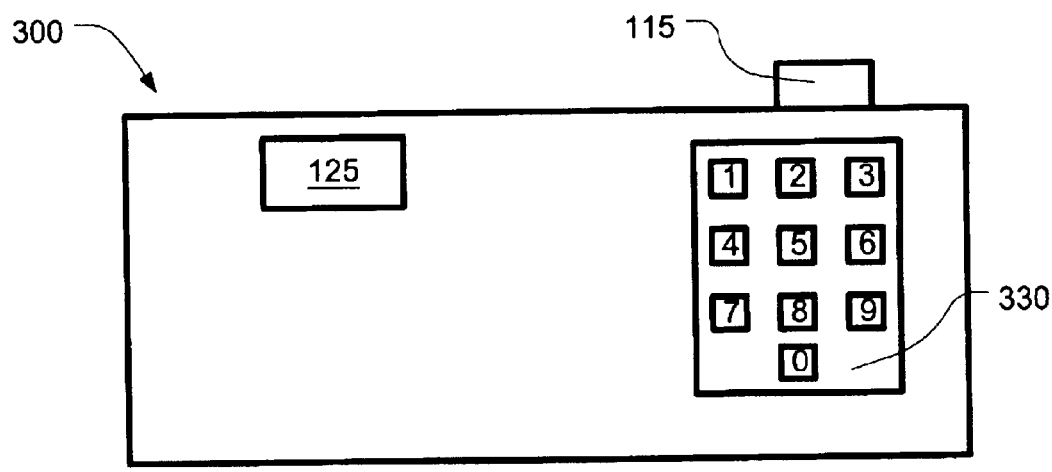
FIG. 3 is a back view of an alternative embodiment of the camera shown in FIG. 1.
Figure 4:
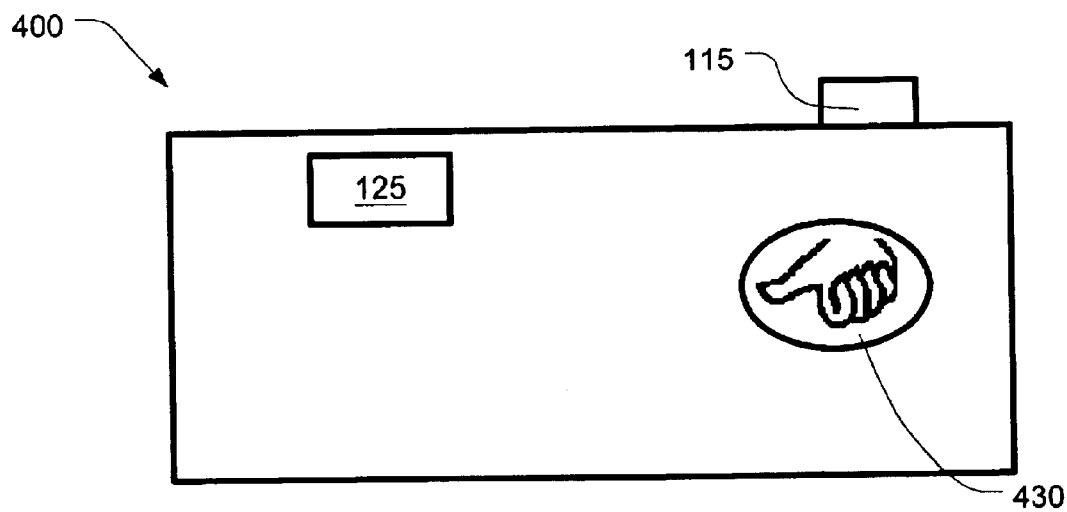
FIG. 4 is a back view of another embodiment of the camera shown in FIG. 1.
Figure 5:
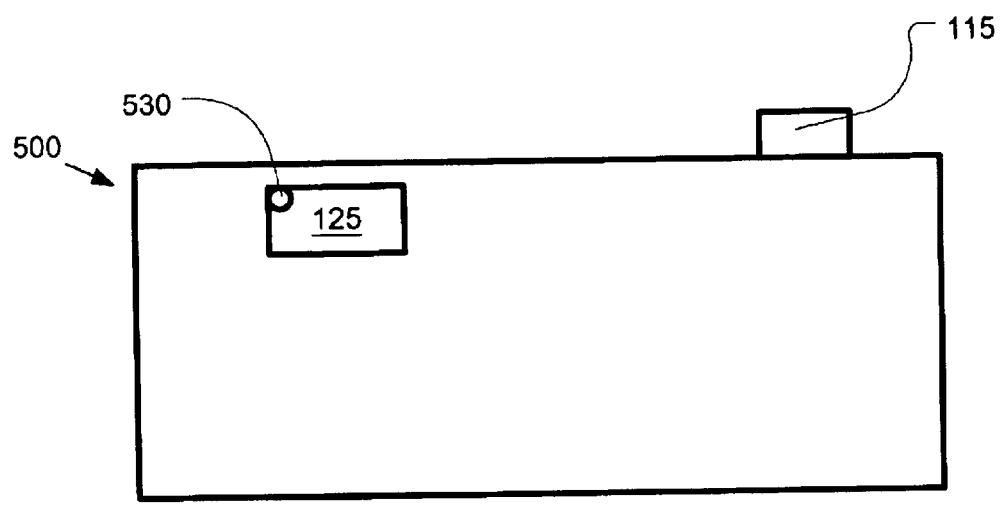
FIG. 5 is a back view of yet another embodiment of the camera shown in FIG. 1.
Figure 6:
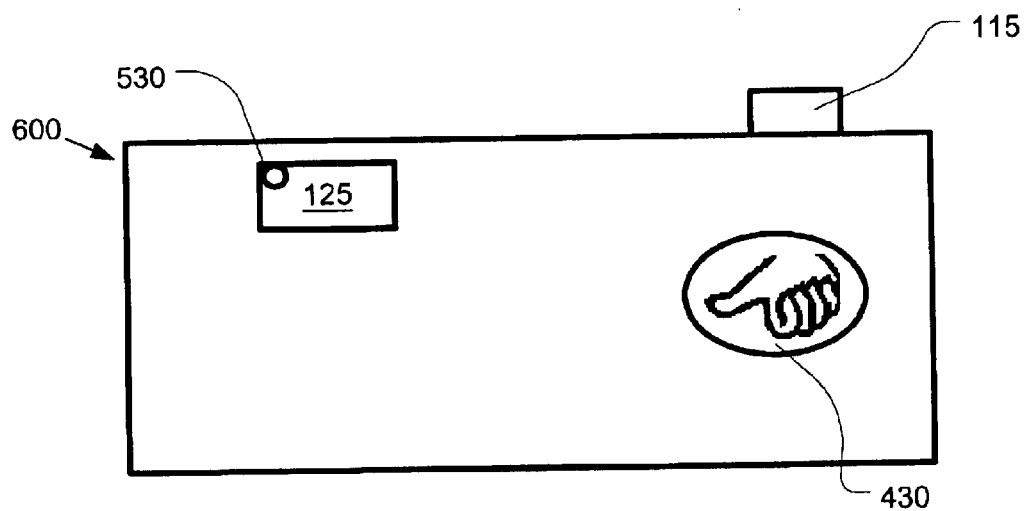
FIG. 6 is a back view of still another embodiment of the camera shown in FIG. 1.

The user identification sensor may also be placed at other locations on the camera body 105. In this regard, FIG. 3 shows a rear view of an alternative embodiment of a camera 300, in which the user identification sensor includes a keypad 330 on the back of the camera. The keypad 330 also provides an added measure of security since each user will have their own personal identification number that is not known to the other users. FIGS. 4–6 illustrate other embodiments of a camera with secure user identification sensors. In particular, the user identification sensors shown in FIGS. 4–6 include physical attribute sensors, which can identify different users without using personal identification numbers.

FIG. 4 shows a camera 400 with a fingerprint sensor 430. The fingerprint sensor 430 is preferably a thumbprint sensor arranged in a position that will be aligned with a user's thumb during normal operation of the camera 400. FIG. 5 illustrates a camera 500 with a retinal scanner 530 arranged in the back side of the view finder 125 for identifying users based upon characteristics of their eyes. In FIG. 6, both a retinal scanner 530 and a fingerprint scanner 430 are included in the camera 600 so as to provide an additional level of security and accuracy for the identification of a user of the camera 600. Although the physical attribute sensors 430 and 530 have been described above with regard to sensing fingerprint and/or ocular attributes, any other physical attribute which is substantially different to each user in a group of users may be used to perform the identification of a user.

Returning to FIG. 1, this figure also includes a block diagram of certain components for implementing a photo system 140 for managing various operational aspects of the camera 100 as described in more detail below. The photo system 140 may be implemented in a wide variety of electrical, electronic, computer, mechanical, and/or manual configurations. However, in a preferred embodiment, the photo system 140 is at least partially computerized with various aspects of the system being implemented by software, firmware, hardware, or a combination thereof.

In terms of hardware architecture, the photo system 140 includes a processor 150, memory 160, and one or more input and/or output ("I/O") devices, such as a photosensor 170, switch 130, flash 120, and/or shutter control 115. Again, although not shown in FIG. 1, light sensors, exposure controls, microphones, and/or other I/O devices may also be provided (and may include their own memory and processors). Each of the I/O devices may be communicatively coupled via a local interface 180 to the processor 150. However, for the sake of simplicity, the interface 180 for the flash 120 and shutter control 115 are not shown in FIG. 1.

The local interface 180 may include one or more buses, or other wired connections, as is known in the art. Although not shown in FIG. 1, the interface 180 may have other communication elements, such as controllers, buffers (caches) driver, repeaters, and/or receivers. Various address, control and/or data connections may also be provided with the local interface 180 for enabling communications among the various components of the computer 140.

The photosensor 170 is preferably a charge-coupled device, or complimentary metal-oxide semi conductor sensor for capturing image data. However, a variety of other data capture devices may also be used, instead of, or in conjunction with, the photo sensor 170. For example, the camera 100 may be provided with a microphone for capturing audio data, a personal digital assistant for capturing personal data, and/or a receiver or connection for receiving data from an external I/O device, such as a radio transmitter.

The memory 160 may have volatile memory elements (e.g., random access memory, or "RAM," such as DRAM, SRAM, etc.), nonvolatile memory elements (e.g., hard drive, tape, read only memory, or "ROM," CDROM, etc.), or any combination thereof. The memory 160 may also incorporate electronic, magnetic, optical, and/or other types of storage devices. A distributed memory architecture, where various memory components are situated remote from one another, may also be used.

The processor 150 is preferably a hardware device for implementing software that is stored in the memory 160. The processor 150 can be any custom-made or commercially available processor, including semiconductor-based microprocessors (in the form of a microchip) and/or macroprocessors. The processor 120 may be a central processing unit ("CPU") or an auxiliary processor among several processors associated with the computer 100. Examples of suitable commercially-available microprocessors include, but are not limited to, the PA-RISC series of microprocessors from Hewlett-Packard Company, U.S.A., the 80x86 and Pentium series of microprocessors from Intel Corporation, U.S.A., PowerPC microprocessors from IBM, U.S.A., Sparc microprocessors from Sun Microsystems, Inc, and the 68xxx series of microprocessors from Motorola Corporation, U.S.A.

The memory 160 stores software in the form of instructions and/or data for use by the processor 150. The instructions will generally include one or more separate programs, each of which comprises an ordered listing of executable instructions for implementing one or more logical functions. The data will generally include a collection of user settings and one or more stored media data sets corresponding to separate images, audio or video segments, and/or multimedia clips that have been captured by camera 100. In the particular example shown in FIG. 1, the software contained in the memory 160 includes a suitable operating system ("O/S") 162, along with a control system 164, user settings data 166, and captured image data 168.

The operating system 162 implements the execution of other computer programs, such as the control system 164, and provides scheduling, input-output control, file and data management, memory management, communication control, and other related services. Various commercially-available operating systems 162 may be used, including, but not limited to, the DigitaOS operating system from Flash-point Technologies, U.S.A., the Windows operating system from Microsoft Corporation, U.S.A., the Netware operating system from Novell, Inc., U.S.A., and various UNIX operating systems available from vendors such as Hewlett-Packard Company, U.S.A., Sun Microsystems, Inc., U.S.A., and AT&T Corporation, U.S.A.

In the architecture shown in FIG. 1, the control system 164 may be a source program (or "source code"), executable program ("object code"), script, or any other entity comprising a set of instructions to be performed as described in more detail below. In order to work with a particular operating system 162, any such source code will typically be translated into object code via a conventional compiler, assembler, interpreter, or the like, which may (or may not) be included within the memory 160. The control system 164 may be written using an object oriented programming language having classes of data and methods, and/or a procedure programming language, having routines, subroutines, and/or functions. For example, suitable programming languages include, but are not limited to, C, C++, Pascal, Basic, Fortran, Cobol, Perl, Java, and Ada.

When the control system 164 is implemented in software, as is shown in FIG. 1, it can be stored on any computer-readable medium for use by, or in connection with, any computer-related system or method, such as the photography system 140. In the context of this document, a "computer-readable medium" includes any electronic, magnetic, optical, or other physical device or means that can contain or store a computer program for use by, or in connection with, a computer-related system or 12 method. The computer-related system may be any instruction execution system, apparatus, or device, such as a computer-based system, processor-containing system, or other system that can fetch the instructions from the instruction execution system, apparatus, or device and then execute those instructions. Therefore, in the context of this document, a computer-readable medium can be any means that will store, communicate, propagate, or transport the program for use by, or in connection with, the instruction execution system, apparatus, or device.

For example, the computer-readable medium may take a variety of forms including, but is not limited to, an electronic, magnetic, optical, electromagnetic, infrared, or semiconductor system, apparatus, device, or propagation medium. More specific examples of a computer-readable medium include, but are not limited to, an electrical connection (electronic) having one or more wires, a portable computer diskette (magnetic), a random access memory ("RAM") (electronic), a read-only memory ("ROM") (electronic), an erasable programmable read-only memory ("EPROM," "EEPROM," or Flash memory) (electronic), an optical fiber (optical), and a portable compact disc read-only memory ("CDROM") (optical). The computer readable medium could even be paper or another suitable medium upon which the program is printed, as the program can be electronically captured, for instance via optical sensing or scanning of the paper, and then compiled, interpreted or otherwise processed in a suitable manner before being stored in a the memory 160.

In another embodiment, where the control system 164 is at least partially implemented in hardware, the system may be implemented using a variety of technologies including, but not limited to, discrete logic circuit(s) having logic gates for implementing logic functions upon data signals, application specific integrated circuit(s) ("ASIC") having appropriate combinational logic gates, programmable gate array (s) ("PGA"), and/or field programmable gate array(s) ("FPGA").

Once the photography system 140 is accessed, the processor 150 will be configured to execute instructions in the operating system 162 that are stored within the memory 160 (and/or in any I/O devices). The processor 150 will also receive and execute further instructions in the control system 164, and stored users settings data 166 and image data 168, to and from the memory 160 and/or I/O devices, so as to generally operate the system 140 pursuant to the instructions and data contained in the software and/or hardware as described below with regard to FIG. 7.

Figure 7:
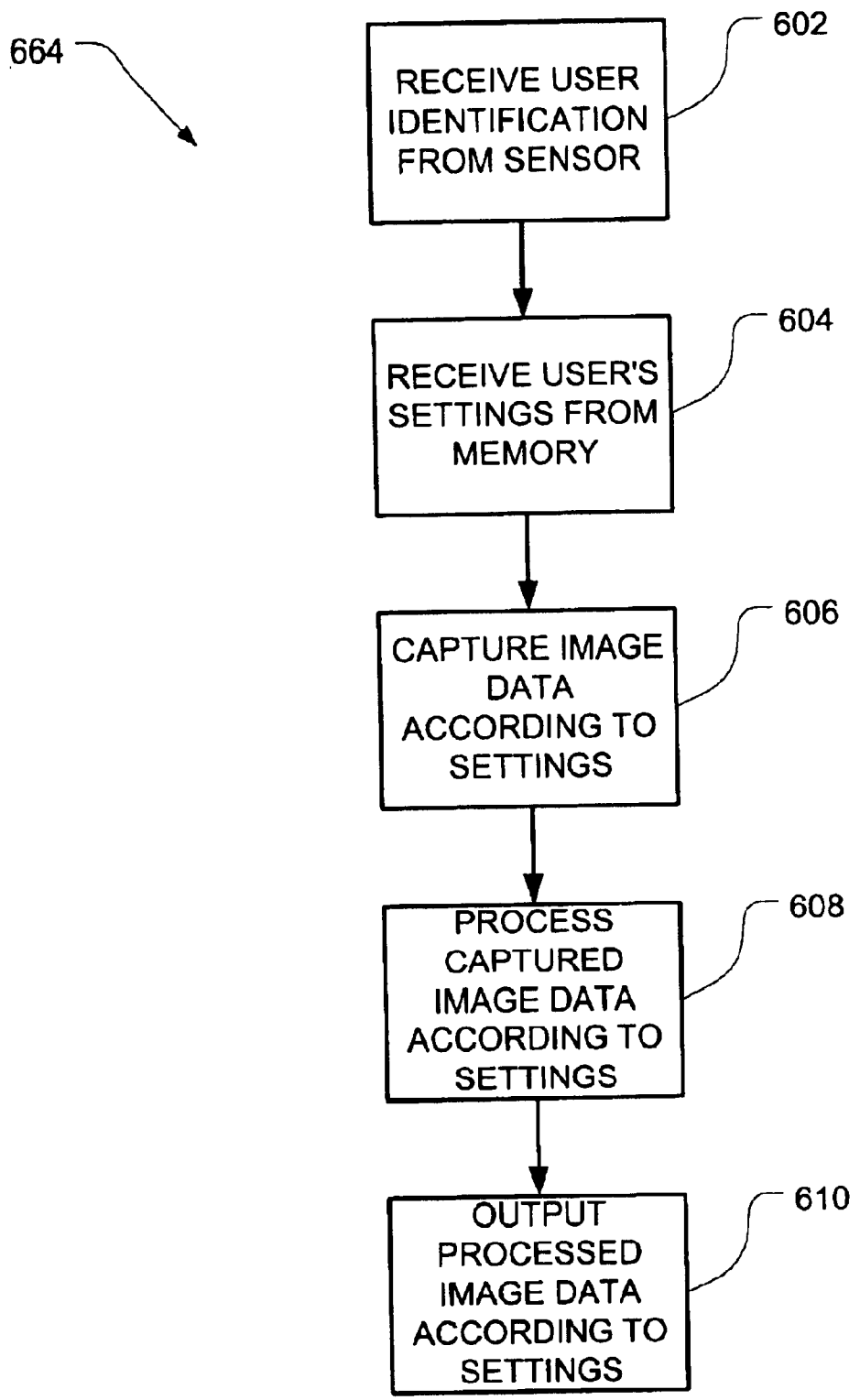
FIG. 7 is a flow diagram for a method according to the present invention for the operation of the cameras shown in FIGS. 1–6.

FIG. 7 is a flow diagram for one embodiment of the control system 164 shown in FIG. 1. More specifically, FIG. 7 shows the architecture, functionality, and operation of a software control system 664 that may be implemented with the system 140 shown in FIG. 1. However, as noted above, a variety of other of computer, electrical, electronic, mechanical, and/or manual systems may also be similarly configured to operate in a similar manner.

Each block in FIG. 7 represents an activity, step, module, segment, or portion of computer code that will typically comprise one or more executable instructions for implementing the specified logical function(s). It should also be noted that, in various alternative implementations, the functions noted in the blocks will occur out of the order noted in FIG. 7. For example, multiple function in different blocks may be executed substantially concurrently, in a different order, incompletely, and/or over an extended period of time, depending upon the functionality involved. Various steps may also be completed manually.

In FIG. 7, a user identification is received from the user identification sensor 130, 330, 430, and/or 530 at step 602. For example, the switch 130 will send a signal corresponding to the position of the arrow 135 pointing to indicia A, B, C, or D in FIG. 2. The user settings data 166 for that particular user is then received and/or retrieved from memory 160 at step 604. Those settings will have been previously entered and stored in memory 160. For example, they might be automatically stored at the completion of that user's last photography session. Alternatively, or in addition, the memory 160 may store a continuing tabulation of use modes for a particular user. Options which are used most often by a particular user may then be set as defaults.

The processor 150 will then use those settings to control the camera 100 when data is captured at step 608. For example, the user settings data may provide information concerning a preferred mode of operation of the camera, such as aperture-preferred, shutter-speed preferred, manual, or automatic exposure modes. Other facets of the operation may also be specified in the user settings data 166, such as flash, shutter, and/or other settings for a particular user. Default settings for an unidentified user may also be provided in the user settings data 166 for controlling the camera 100 when the user is unidentified, or an indicia corresponding to a default user is chosen.

The user's settings data 166 may also include information about how to process the captured image data 168 (such as with date imprinting) and/or output the processed imaged data to a storage medium (such as in a compressed format). If the user settings data 166 includes this information, then the captured image data 168 is processed according to those settings at 608 and/or is output according to those settings at step 610.

What is claimed is:

1. A camera, comprising:
    a memory for storing at least one camera setting that affects a mode of image capture of the camera in association with a particular user;
    a physical attribute sensor for recognizing a unique physical attribute of the user to identify the user from the uniqueness of the physical attribute; and
    a processor for controlling the camera according to said stored at least one camera setting to automatically change the mode of image capture of the camera in response to a signal from the sensor that indicates that the user has been identified.

2. The camera recited in claim 1 wherein said physical attribute sensor comprises at least one of a fingerprint sensor and a retinal scanner.

3. The camera recited in claim 1 wherein the setting is an exposure mode setting selected from the group consisting of aperture-preferred, shutter speed-preferred, and automatic exposure settings.

4. A camera, comprising:
    means for recognizing a unique physical attribute of a user of the camera to identify the user from the uniqueness of the physical attribute; and
    means for automatically controlling time camera according to stored photographic control settings associated with an identified user, the photographic control settings relating to at least one of aperture-preferred exposure mode, shutter-speed preferred exposure mode, manual exposure mode, automatic exposure mode, flash control, shutter control, and date imprinting.

5. The camera recited in claim 4, wherein said means for identifying a physical attribute of a user comprises at least one of a fingerprint sensor and a retinal scanner.

6. A computer readable medium for use with a camera, comprising:
    logic for recognizing a unique thumbprint of a user of the camera to identify the user from the uniqueness of the thumbprint; and
    logic for controlling the camera according to stored photographic control settings associated with an identified user, the control settings affecting a mode of image capture of the camera.

7. The computer readable medium recited in claim 6, wherein the logic for controlling the camera includes logic for setting a mode of operation selected from the group consisting of art exposure mode, a flash mode, and a shutter control mode of operation.

8. The computer readable medium recited in claim 6, wherein the logic for identifying a physical attribute of a user of the camera includes logic for receiving input from at least one of a fingerprint sensor.

9. A method of operation for a camera, comprising:

identifying a user from the uniqueness of a user physical attribute by recognizing a unique physical attribute of the user; and controlling the according stored camera photographic control settings associated with that user, the settings affecting a mode of image capture including at least one of aperture-preferred exposure mode, shutter-speed preferred exposure mode, manual exposure mode, automatic exposure mode flash control, and shutter control.

10. The method recited in claim 9, wherein said receiving step includes receiving a signal from at least one of a fingerprint sensor and a retinal scanner.

11. A camera, comprising:

a memory for storing at least one image data processing setting in association with a particular user;

a thumbprint sensor for identifying the user; and a processor for controlling the camera according to said at least one image data processing setting in response to a signal from the sensor that indicates that the user has been identified.

12. The camera recited in claim 11, wherein the at least one data processing setting comprises at least one of a date imprinting setting and a compressed format setting.

* * * * *